United States Patent [19]
Bruno

[11] Patent Number: 5,094,707
[45] Date of Patent: Mar. 10, 1992

[54] APPARATUS FOR EXTRUDING PLASTIC STORAGE BAGS

[76] Inventor: Edward C. Bruno, 15336 E. Tenwood Pl., Aurora, Colo. 80015

[21] Appl. No.: 557,696

[22] Filed: Jul. 25, 1990

[51] Int. Cl.⁵ .................. B29C 47/08; B32B 31/18
[52] U.S. Cl. .................. 156/244.15; 156/244.18; 156/244.19; 156/251; 156/515; 156/553
[58] Field of Search .......... 156/66, 244.15, 244.18, 156/244.19, 251, 259, 271

[56] References Cited

U.S. PATENT DOCUMENTS

| | | | |
|---|---|---|---|
| Re. 29,208 | 5/1977 | Naito | 156/244.15 |
| 4,024,010 | 5/1977 | Boccia | 156/251 |
| 4,892,512 | 1/1990 | Branson | 156/66 |

Primary Examiner—Michael W. Ball
Assistant Examiner—Nancy T. Krawczyk
Attorney, Agent, or Firm—Leo J. Aubel

[57] ABSTRACT

An apparatus and method is provided for fabricating storage bags that have complementary sealing ribs out of stock material which may be a tubular extruded stock. When produced according to this apparatus and method, the storage bags have open mouths, that is, the sealing ribs are not engaged. The apparatus includes a separator bar to separate and disengage the sealing ribs prior to transversely joining the tube to form the side edges of the bag. Guide plates and a platen maintain alignment of the separated sealing ribs when the side edges are formed. The formed bags are then sequentially cut from the tube.

10 Claims, 8 Drawing Sheets

APPARATUS FOR EXTRUDING PLASTIC STORAGE BAGS

FIELD OF THE INVENTION

The present invention is generally directed to apparatus and method for producing storage bags which may selectively be opened and closed. The invention is specifically directed to a continuous extrusion process wherein storage bags are sequentially formed out of an extruded tube of plastic. The present invention further is specifically directed to the fabrication of storage bags out of a continuously extruded tube in a manner such that each bag is unsealed when severed therefrom.

BACKGROUND OF THE INVENTION

Adequate methods and containers for the storage of food and other items have long been a concern of human kind. Modern technology advances in storage bag technology have lead to increased utilization of resealable plastic storage bags in the packaging industry as a primary packaging source for a panoply of manufactured or processed goods. Thus, industrial demand for such storage bags continues to expand. A second market exists for these resealable bags, and that market is directed to consumer need for a storage product that can be easily used by the consumer for storing and restoring various items. Thus, on one hand, resealable plastic storage bags form the primary packaging for many products so that the purchasers of the products receive the bag incidentally as the distribution container for the product while, on the other hand, resealable plastic storage bags are purchased as a stand-alone consumer item.

One example of the value of resealable, and therefore reusable, plastic storage bags is found in the food packaging industry. Technological advances, for example in fields of refrigeration and chemical preservation, have generally lead to improvements in the quantity, quality and diversification of food available; such advances contribute significantly in improving health and well-being of persons throughout the world. These advances avoid the necessity of immediate consumption of food items to avoid spoilage; rather, unconsumed food items may be retained and stored for later consumption. This creates a need for suitable storage containers. Accordingly, food packaging technologies have had a role both in the area of initial, i.e. primary, food packaging and the repackaging of food after removal from its original packaging. The present invention concerns both aspects of packaging and food preservation. A wide variety of primary packaging, that is, the original packaging in which the food item sold, is of a type that, once opened, is either unavailable for re-use or is inconvenient for re-use. A need for secondary repackaging naturally occurs where the initial packaging contains a larger quantity of a food item than is required for preparation so that the excess needs to be stored. The need for secondary re-packaging also results, when an excess quantity of a food item has been prepared so that servings thereof remain after a meal. Discarding these "leftovers" wastes the food; therefor, when practical, many persons desire to restore "left-over" both as an economical measure and for convenience for preparing a future meal. Typical containers for re-storage include glass and plastic jars, plastic canisters, flexible plastic wraps, waxed and/or oiled papers, plastic storage bags, and the like. Of these described products for the re-storage of food, one of the most convenient and useful is the plastic storage bag.

Plastic storage bags have found increased popularity in recent times due to the development of closure means which are formed integrally with the storage bag. These intregal closing structures typically are in the form of matable ribs which extend in opposed relation to one another on facing panels that for the bag and adjacent to the mouth of the flexible bag; these ribs may be mated to close the mouth of the storage bag yet separated to open the mouth of the bag thereby accessing the interior either to store an item or to remove an item from the storage bag. Not only are these storage bags convenient for the temporary re-storage of "leftovers" but also these storage bags are useful in the temporary packaging of individualized food portions for transport, for example, for individualized portions of sandwiches and other food items that are included in a home prepared lunch taken to school or to the work place. Further, these re-sealable plastic storage bags are convenient and highly useful to repackage items or food stuff where the same cannot readily be restored in the original packaging once that packaging is opened. Recognizing the value of these recloseable plastic bags, many food processors have implemented such bags as primary packaging for food items distributed to consumers so that the consumer can re-use the initial packaging to restore food portions.

As described more fully in the specification of this application, the common apparatus and method for production of re-sealable plastic storage bags utilizes a extrusion process wherein a continuous tube of plastic material is extruded with the matable ribs being integrally extruded longitudinally on the inside sidewall of the tube. This tube is flattened to engage the mating ribs and the tube is longitudinally slit to create the mouth opening for the storage bags ultimately cut from the continuous tube. This continuous tube is then transversely sealed at spaced longitudinal locations so that storage bags are serially formed adjacent one another out of the tube of material. The storage bags are sequentially cut from the tube and packaged for sale and use.

A disadvantage has long been recognized in the sealed storage bag which results from this manufacturing technique. As a result of engaging the longitudinal sealing ribs, each storage bag which is cut from the continuous tube accordingly has its matable sealing ribs engaged so that the resultant storage bag is closed when packaged. This is highly disadvantageous in an industrial setting wherein these plastic bags are to be used as primary packaging. Due to the fact that the bags are closed, the need to open the bag for insertion of product requires significant time in a production operation. Indeed, where an open recloseable bag is available, packaging labor costs could be reduced by as much as one-third.

On the other hand, where consumer use is the concern, the closed bag presents other problems. When the consumer or other individual uses the storage bag, it is first necessary of course to open the bag by disengaging the sealing ribs prior to insertion of items into the bag. Due to the effectiveness of the above-described bag closure, however, it is sometimes difficult to open the storage bag, for instance when the user's hands are slippery from grease, water or other substances commonly encountered in food preparation environments. Likewise, it is difficult to open these storage bags where the users hands are otherwise occupied. Finally, many elderly people find it difficult to initially open a storage bag which is empty and is in a flattened state due to the inability to readily grip the relatively narrow top margins of the storage bag adjacent the mouth opening; whereas, once a storage bag has items stored therein, it is easier to grip the front and back panels to open the same. Even though the description above has been specifically directed to food packaging and storage, the broader usage of resealable storage bags for primary packaging and secondary restorage experiences similar problems and needs. Accordingly, there is a long felt need for a method and apparatus for producing storage bags that are in an open condition when packaged for use and sale.

SUMMARY OF THE INVENTION

It is an object of the present invention to provide a new and useful apparatus and method for fabricating plastic storage bags of the re-sealable type which storage bags, when so formed, are open.

Another object of the present invention is to provide an apparatus and method for fabricating storage bags wherein storage bags may be sequentially severed from extruded tube of material, such as plastic, with each bag so fabricated having matable ribs that are engaged only at side edge locations whereby each storage bag is in an open state when cut from the tube.

Yet another object of the present invention is to provide a method and apparatus wherein resealable storage bags are formed in an in-line extrusion with each bag having an open mouth when finished.

A further object of the present invention is to provide an apparatus and a method for fabricating plastic storage bags in lateral sets of bags with each set being sequentially cut from an extruded tube of plastic material and configured for mounting on a dispensing rack.

According to the present invention, then, an apparatus and a method for fabricating plastic storage bags is disclosed herein wherein each bag has front and back panels joined together around a perimeter to form an open mouth communicating with a bag interior and wherein each such bag has a pair of complimentary sealing ribs extending between opposite side edges. The sealing ribs include a male rib on one of the front and back panels and a female rib on the other of said panels with these ribs oriented to engage one another to close the mouth of the bag and separable to open the mouth.

In its broad form, the apparatus adapted to fabricate the above described storage bags can be used out-of-line with pre-formed tubular stock, in-line with tubular stock fabricating equipment or in-line with extrusion equipment. In any event, the bags are formed from a continuous tube of plastic material having a tube interior and wherein the tube includes the pair of complementary sealing ribs formed integrally and longitudinally along the tube interior such that each of the sealing ribs are parallel to one another with first and second arcuate tube portions extending between the two ribs. A flattening assembly is located downstream of the extruder and operates to flatten the tube so that the tube has longitudinal panel facing one another and first and second longitudinal tube edges on the lateral sides of the flattened tube. The sealing ribs are thus opposed to one another in a pre-engagement orientation whereby the longitudinal tube edges are diametrically opposed to one another and located, respectively, along the first and second arcuate tube portions. A slitting apparatus cuts the flattened tube longitudinally along one of the arcuate tube portions located between the sealing ribs so as to provide an entryway into the tube interior. A guide assembly is located downstream of the slitting apparatus and includes guide members which extend through the slit into the tube interior. The guide members receive and guide the sealing ribs so that each of the sealing ribs are positioned in pre-engagement alignment with the other. A drive assembly engages the continuous tube and is operative to advance the tube in a downstream direction so that the sealing ribs advance through the male and female guide members. An edge sealer and cutter assembly operates to form side edges for adjacent storage bags and to cut the storage bags from one another. In this manner the respective sealing ribs are engaged at the side edges of the respective storage bag while the lengths of each of the sealing ribs which extend between the side edge seals are disengaged from one another at the time the storage bag is cut from the tube, thus producing storage bags having open mouths. The bags may then be packaged as desired.

In the preferred form of the present invention, the guide assembly is in the form of a central platen which is flanked by a pair of guide plates closely spaced to form a pair of guide channels. The platen has a pair of oppositely opening grooves sized to receive a respective sealing rib with the panel strips of the extruded tube passing through the guide channels between the central platen and the guide plates. Preferably, the opposite surfaces of the central platen are parallel to one another and the guide surfaces of each of the guide plates are parallel to the respective facing surface of the central platen. Further, in the preferred apparatus, the flattening apparatus actually engages the sealing ribs, and a separator arm is located downstream of the slit assembly and upstream of the guide assembly and is operative to disengage the sealing ribs to prepare them for aligned entry into the guide assembly. This separator arm is a bar that extends through the slit and between the sealing ribs whereby each respective sealing ribs passes on and opposite side of the separator arm to become disengaged from the other. This separator has a rounded cross-section to minimize any damage to the sealing ribs.

The drive assembly may include a pair of drive rollers each having formed therein a circumferential channel sized and positioned to accommodate the male and female ribs so that the tube may be advanced between the drive rollers without re-engagement of the ribs. The drive rollers may be located between the sealing apparatus and the cutter assembly or, alternately, located between the guide assembly and the sealing apparatus.

The edge sealer and the cutter assembly may be constructed as a common piece of equipment so that the tube is simultaneously sealed and cut along the sealing band, for example, by a hot knife. In one form of the invention, the extruder operates to extrude the tube with a plurality of complimentary pairs of cooperating sealing ribs so that a plurality of storage bags are simultaneously formed laterally adjacent one another with these storage bags being connected by longitudinal joining strips. The longitudinal joining strips may be advanced through a perforator which perforates the joining strip allowing a connected pair of storage bags later to be separated from one another along the respective perforations. Further, in this embodiment, a hole former is associated with the perforator so that longitudinally spaced mounting holes are formed in the adjoining strip thereby allowing a connected pair of storage bags to be mounted on opposite sides of a dispensing rack.

The preferred method of the present invention fabricates storage bags as above described and generally includes the steps of providing, at an upstream location, a continuous tube of material having continuous sealing ribs located longitudinally therealong at spaced circumferential interior locations, advancing the tube in a downstream direction, flattening and slitting the tube so that the sealing ribs are positioned in opposed relation to one another with a longitudinal slit being formed in the tube, guiding the tube in a manner such that the sealing ribs are maintained in separated yet aligned pre-engagement relation, transversely sealing and cutting the tube to form side edges for adjacent storage bags and to cut the storage bags from the tube so that the sealing ribs being engaged only at the side edges to produce storage bags each having an open mouth with the respective male and female ribs disengaged. This broad method contemplates that the step of flattening the tube acts to matably engage the male and female ribs and therefor includes a step of dis-engaging and separating the male and female ribs prior to guiding and transversely sealing the tube. The steps of transversely sealing the tube and severing the tube may be performed substantially simultaneously or sequentially. Again, transverse sets of bags can be formed and longituding joining strip therebetween can be perforated so that the bags are partible. The method can include the step of extruding the tube of material as an in-line fabricating process.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 5 is a transverse cross-sectional view of an extruded plastic tube out of which is fabricated the storage bag shown in FIGS. 1 and 2;

FIG. 8(a) is transverse cross-sectional view of an extruded plastic tube prior to being longitudinally slit, and FIG. (b) is a transverse cross-section view of the tube shown in FIG. 8(a) after being longitudinally slit and entering the fabrication apparatus shown in FIG. 6;

DETAILED DESCRIPTION OF THE EXEMPLARY EMBODIMENTS

The present invention is directed to an apparatus adapted to fabricate plastic storage bags as a continuous extrusion operation. As such, the present invention also contemplates a fabrication method for these storage bags. A representative storage bag which may be fabricated according to the prior art and likewise by the present invention is shown in FIGS. 1 and 2.

Figure 1:
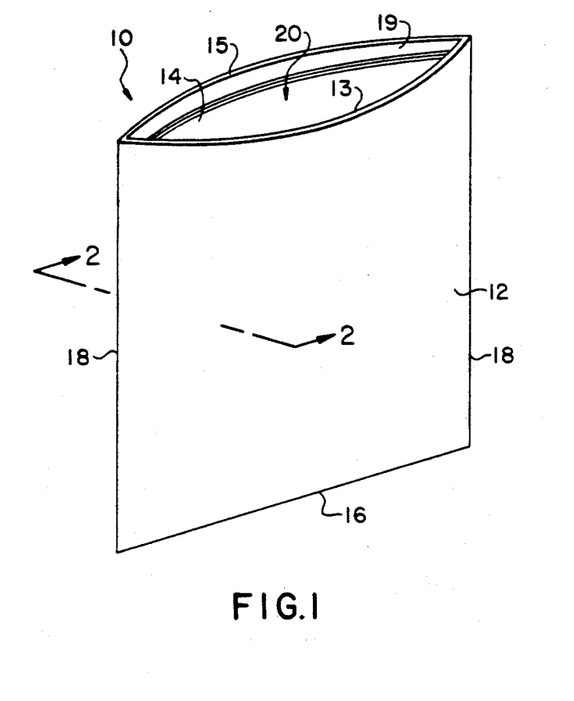
FIG. 1 is a perspective view of an exemplary storage bag as is known in the art and is fabricated by the method and apparatus of the present invention.
Figure 2:
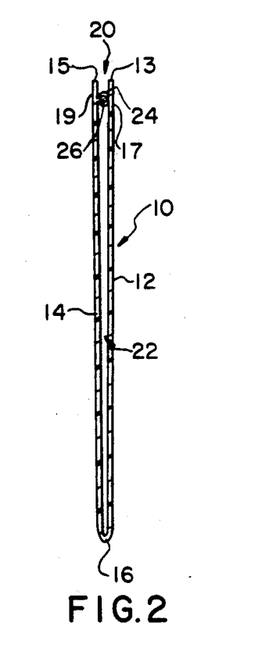
FIG. 2 is a cross-section view taken about lines 2—2 of FIG. 1.

In FIG. 1, storage bag 10 is seen to have the front panel 12, a back panel 14 which are joined together around a perimeter portion so that they are joined along a common bottom edge 16 and common side edges 18. Front panel 12 has a top edge 13 and a back panel 14 has a top edge 15 which define a mouth 20 opening into the interior 22 of storage bag 10. Complimentary sealing ribs extend between side edges 18 proximate mouth 20 so that top edge margins 17 and 19 are respectively adjacent top edges 13 and 15. The sealing ribs are defined by a female sealing rib 24 located on front panel 12 proximate top edge 13 and on the interior of storage bag 10, and a male sealing rib 26 located on the interior of storage bag 10 proximate top edge 15 of back panel 14. Ribs 24 and 26 may be engaged with one another so that storage bag 10 is closed, as shown in FIG. 2, but ribs 24 and 26 may be separated from one another to open mouth 20, and therefor storage bag 10, as is shown in FIG. 1. In the opened state, shown in FIG. 1, items such as food or objects may be inserted and removed from storage bag 10.

Figure 3:
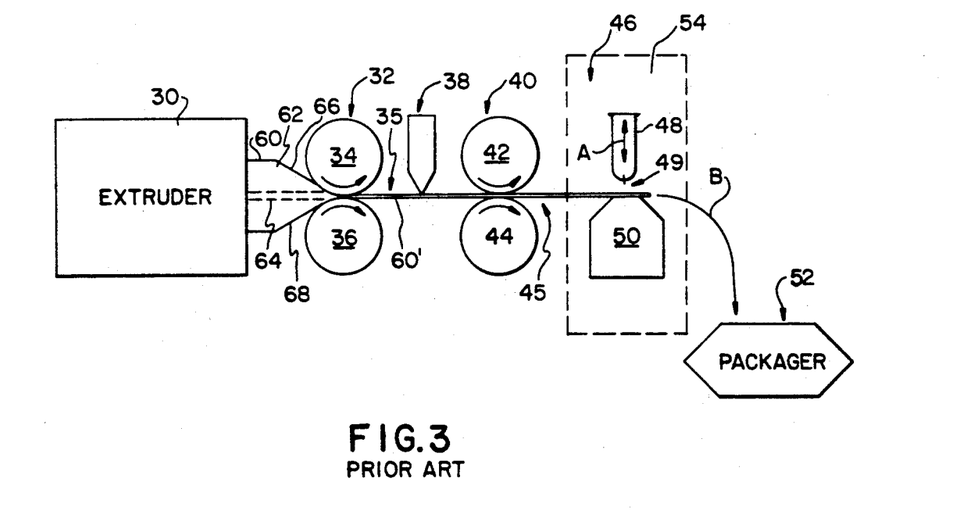
FIG. 3 is a diagrammatic view of the apparatus known in the prior art and employed to fabricate plastic storage bags.
Figure 4:
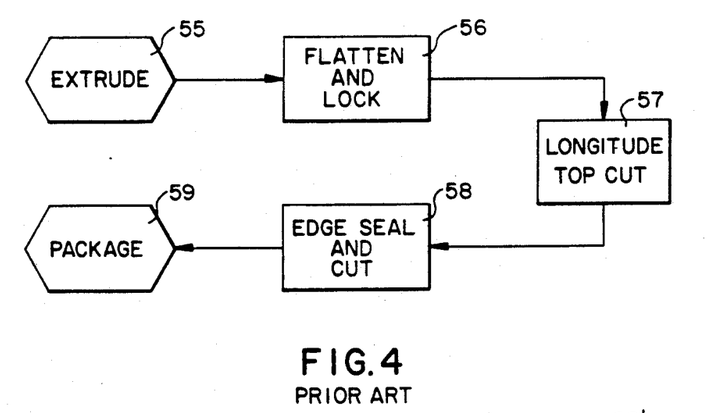
FIG. 4 is a block diagram showing the broad processing steps according to the prior art method and apparatus for the fabrication of plastic storage bags of FIG. 3.

In order to produce a storage bag 10, the standard prior art process and apparatus is shown in FIGS. 3 and 4. In FIG. 3, it may be seen that the prior art apparatus includes an extruder 30 operative to continuously extrude tube 60 of plastic material which has formed integrally therewith longitudinal sealing ribs 62 and 64 one of which is in the form of female sealing rib 24 and the other of which is in the form of male sealing rib 26. A flattening assembly 32 may be in the form of a pair of drive rollers including an upper roller 34 and a lower roller 36 which cooperate to collapse tube 60 into a pair of opposed longitudinal panel strips such as upper panel strip 66 and lower panel strip 68. Flattened tube 60' is then advanced in a downstream direction past a slit assembly 38 which operates to longitudinally sever tube 60' thereby defining a mouth slit for the continuous tube. Drive assembly 40 is provided to advance the tube 60, 60' from the upstream location in a downstream direction toward a transverse edge sealer and cutter assembly 46. To this end, drive assembly 40 includes an upper drive roller 42 and a lower drive roller 44. It should also be appreciated that, at the locations designated as 35 and 45, sealing ribs 62 and 64 are engaged with one another which condition has occurred as the tube 60, 60' is flattened by flattening assembly 32. Edge seal and cut assembly 46 includes a combination transverse edge sealer and cutter 48 which is reciprocally movable up and down in a direction shown by arrow A so as to bear against anvil 50. Thus, as flattened tube 60' is passed through the region 49 between sealer/cutter 48 and anvil 50, transverse edge seals are formed as transverse seal bands that define side edges 18 of each consecutive adjacent storage bag and these adjacent storage bags are severed from one another within this seal band. Individual fabricated bags are then discharged at arrow B and are processed by packager 52 into any convenient packaging format.

The steps of this prior art process may be appreciated by consideration of the block diagram shown in FIG. 4. Here, the first step is shown at 55 as the extrusion of the continuous plastic tube which is flattened and locked at step 56 after which the extruded tube is longitudinally top cut as shown by method block 57. It should be understood that this longitudinal top cut, which is accomplished by slit assembly 38, for example, forms top edges 13 and 15 for each storage bag 10 that is produced by the fabrication assembly. After being longitudinally top cut, the tube is transversely edge sealed and cut, at 58, to form individual storage bags which are then packaged by packaging step 59.

Figures 5, 8A, 8B:
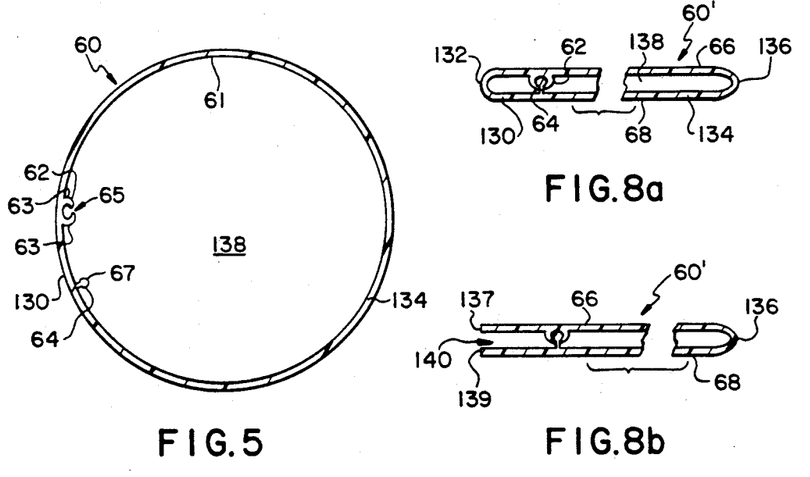

Before discussing the modifications to the apparatus shown in FIG. 3 and the processing steps shown in FIG. 4 implemented by that apparatus, reference may be made to FIG. 5 which shows a transverse cross-sectional view of the extruded plastic tube 60 out of which is formed the storage bags of FIGS. 1 and 2 according to both the prior art and according to the present invention. In FIG. 5, it may be seen that extruded tube 60 is generally circular in cross-section when extruded and has a tube interior 138. Female sealing rib 62 is formed longitudinally on the interior sidewall 61 of tube 60 and includes a pair of webs 63 that form a channel 65 therebetween. Male rib 64 likewise is formed longitudinally on the interior surface 61 of tube 60. Male rib 64 has an enlarged bead 67 which is received in channel 65 when male rib 64 is mated with female rib 62. Ribs 62 and 64 are parallel to one another and are circumferentially spaced around the interior surface 61 of tube 60 so that a first arcuate tube portion 130 and a second arcuate tube portion 134 extend between ribs 62 and 64 on either side thereof. As noted above, the prior art method and apparatus fabricates tube 60, shown in FIG. 5, into consecutively formed storage bags each of which are in the sealed state. The present apparatus and method, however, as described below, processes tube 60, shown in FIG. 5, into consecutively formed storage bags each having an open mouth when cut therefrom.

It is to be understood, however, that this invention in its broadest form, can be used with a pre-formed stock of tubular material so that the extruder is not in-line with the remainder of the bag forming apparatus. Likewise, other techniques of forming the stock are contemplated herein. For example, one such technique known in the art is to heat seal a pair of strips, each carrying one of the complementary sealing ribs, along the longitudinal edges of a continuous sheet of material that is folded to make the body portion of each storage bag. The present invention, though, is discussed with reference to the continuous extrusion process.

Figure 6:
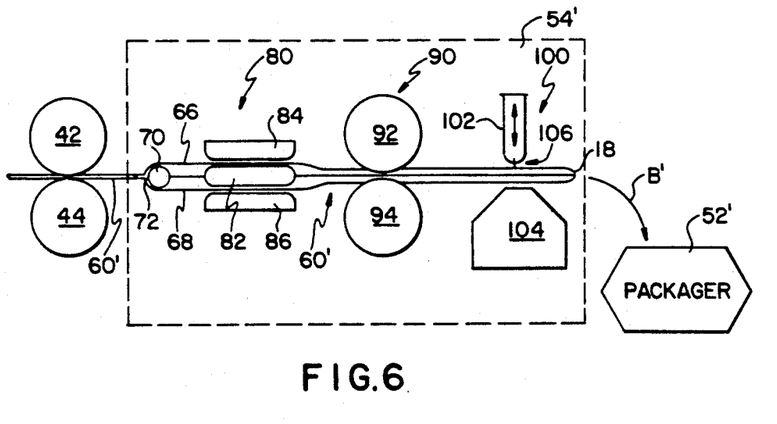
FIG. 6 is a diagrammatic view showing the preferred exemplary form of the apparatus of the present invention modifying the assembly shown in FIG. 3.

The exemplary embodiment of present invention specifically modifies the apparatus and method in the fabrication assembly and steps performed within the dotted block 54 in FIG. 3. With reference to FIG. 6, it may be shown that a similar block 54' includes additional structural apparatus which accomplishes additional processing steps diagrammed in FIG. 7. With reference to FIG. 6, then, it may be seen that the exemplary apparatus of the present invention includes a separator bar 70 which extends between panel strips 66 and 68 so that, as tube 60' is advanced downstream from drive rollers 42 and 44, panel strip 66 passes above separator bar 70 while panel strip 68 passes below separator 70. Accordingly, sealing ribs 62 and 64 are disengaged from one another. In order to avoid damage to the sealing ribs, separator bar 70 has a rounded cross-section, preferably ovoid, so that an upstream portion 72 of separator bar 70 presents a smooth arcuate profile about which sealing rib 64 and 66 are trained.

After disengagement of sealing rib 62 and 64, panel strips 66 and 68 are advanced through a guide assembly 80 which includes a central platen 82 and a pair of guide plates, such as upper guide plate 84 and lower guide plate 86. Guide assembly 80 operates to maintain sealing ribs 62 and 64 in a separated relation yet with these ribs aligned with one another in a preengagement orientation. A drive assembly 90 is located downstream of guide assembly 80 and includes an upper drive roller 92 and a lower drive roller 94. Drive rollers 92 and 94 are constructed, as more thoroughly described below, so as to engage and advance flattened tube 60' without reengaging sealing ribs 62 and 64. Tube 60' is accordingly advanced through an edge seal and cut assembly 100, similar to edge sealing cut assembly 46, located downstream of drive assembly 90. Edge seal and cut assembly 100 includes a combination transverse edge sealer and cutter 102 which bears against anvil 104 to seal flattened tube 60' tranversely thereacross and the sever tube 60' as it passes through region 106 between edge sealer and cutter 102 and anvil 104. Therefor, individual bags may be dispensed to packager 52' as shown by arrow B'.

Figure 7:
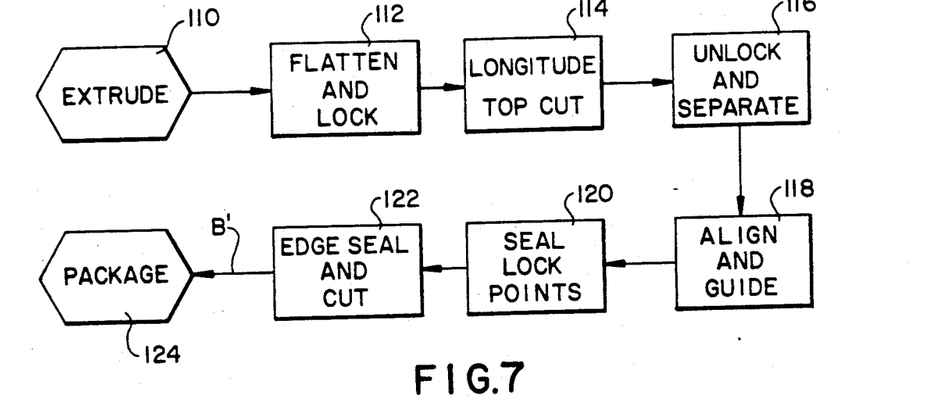
FIG. 7 is a block diagram similar to FIG. 4 but showing the improved processing steps according to the present invention.

The procedural steps accomplished by this improved methodology is diagrammed in FIG. 7 where it may be seen that the continuous plastic tube is extruded at block 110 and then is flattened at 112 with sealing ribs 62 and 64 locked. The flattened and locked bag is then longitudinally top cut at step 114. In a departure from the prior art, however, the flattened, locked and top cut tube is unlocked at 116; that is, sealing ribs 62 and 64 are separated from one another with their associated panel strips likewise being separated. The panel strips and the associated sealing ribs are then aligned and guided at 118 after which the sealing ribs and the associated portions of the tube adjacent the ribs are sealed at lock points, as shown by step 120 and they are edge sealed and cut at step 122. It should be understood that steps 120 and 122 may be accomplished either simultaneously or sequentially, as described below, by seal and cut assembly 100. The individual storage bags, again at B', may be packaged by processing step 124.

The apparatus according to the preferred embodiment of the present invention may now be more fully appreciated with reference to FIGS. 8-12. As is shown in FIG. 8(a), flattened tube 60' may be seen to include the female sealing rib 62 and the male sealing rib 64 longitudinally extending therealong. The first arcuate tube portion 130 has a first longitudinally tube edge 132 and the second arcuate tube portion 134 has a second arcuate tube edge 136 when tube 60 is flattened into flattened tube 60' so that panel strips 66 and 68 are in opposed facing relation to one another. Likewise, as shown in FIG. 8(a), male sealing rib 64 is engaged with female sealing rib 62. Longitudinal tube edges 132 and 136 are diametrically opposed to one another. As is shown in FIG. 7(b), after passing through the slit assembly 38, a slit 140 is formed in first arcuate portion 130 so that longitudinal edges 138 and 139 are formed, respectively, for panel strips 66 and 68.

Figure 9:
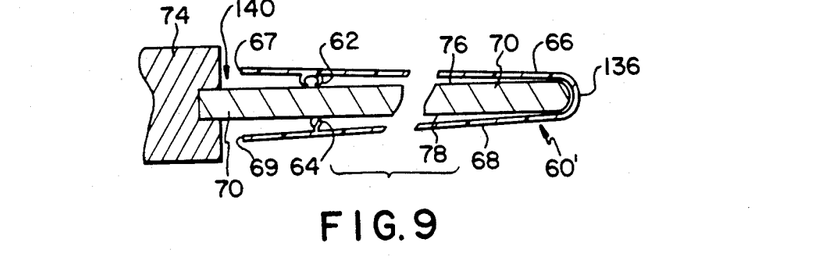
FIG. 9 is a cross-sectional view of the spearator bar shown in FIG. 6.

Flattened tube 60', as noted above, passes around separator arm or bar 70 which, as may be seen in FIG. 9, extends outwardly from a mounting block 74. Separator bar 70 has an upper rounded surface 76 over which panel strip 66 and female sealing rib 62 are trained. Similarly, separator bar 70 has a lower rounded surface 78 over which panel strip 68 and male sealing member 64 are trained. Separator rod 70 should be dimensioned to have a minimum diameter as is reasonably possible; in the preferred embodiment, separator bar 70 has a diameter that is approximately ⅛ inch. Separator rod 70 should be stationary, that is, non-rotating, and rounded in order to avoid damage to the sealing ribs, as noted above. It should be further understood and recognized that the sole purpose of separator bar 70 is to dis-engage male rib 64 from female rib 62 without damaging their profile. Also, it should be appreciated that the tube 60' as shown in FIG. 9 is the desired configuration for performing the storage bag fabrication according to the present invention regardless of whether tube 60' comes from a preformed stock, an in-line extruder or other tube forming machinery.

Figure 10:
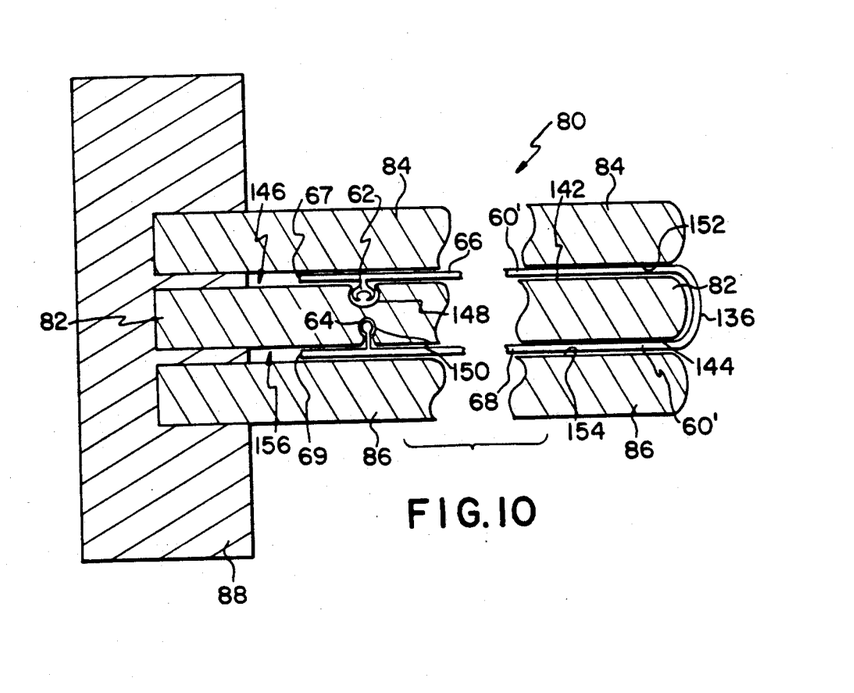
FIG. 10 is a transverse cross-sectional view of the extruded tube and guide assembly shown in FIG. 6.

Once ribs 62 and 64 have been disengaged, tube 60' is advanced past guide assembly 80, best shown in FIG. 10. Guide assembly 80, as described above, includes a central platen 82 and upper and lower guide plates 84 and 86 which, as may be seen in FIG. 10, are rigidly mounted by mounting block 88. As may be seen with greater detail in FIG. 10, though, central plate 82 has first and second platen surfaces in the form of upper platen surface 142 and lower platen surface 144 which are preferably parallel to one another. Guide plate 84 is positioned on a first side of central platen 82 and has a first guide surface 152 which faces upper platen surface 142 in closely spaced apart parallel relation thereto to define a first or upper guide channel 146 therebetween. Likewise, lower guide plate 86 is positioned on the second side of central platen 82 and has a second guide surface 154 which is in closely spaced apart parallel relation to lower platen surface 144 so as to form a second guide channel 156 therebetween. Upper plate surface 142 has a longitudinal groove 148 which is sized and configured to receive female sealing rib 62, and lower platen surface 144 includes a groove 150 sized and configured to receive male sealing rib 64. It may thus be appreciated that, as tube 60' is advanced through guide assembly 80, panel strip 66 advanced through guide channel 146 while panel strip 68 advances through guide channel 156. Sealing ribs 62 and 64 are thus received and aligned in a pre-engagement position by grooves 148 and 150, respectively. To this end also, it may be seen that central platen 82 extends through slit opening 140 between tube edges 137 and 139 and has a distal rounded platen edge 83 which is proximate longitudinal edge 136. This also helps position and align flattened tube 60' as it is advanced through guide assembly 80.

Figure 11:
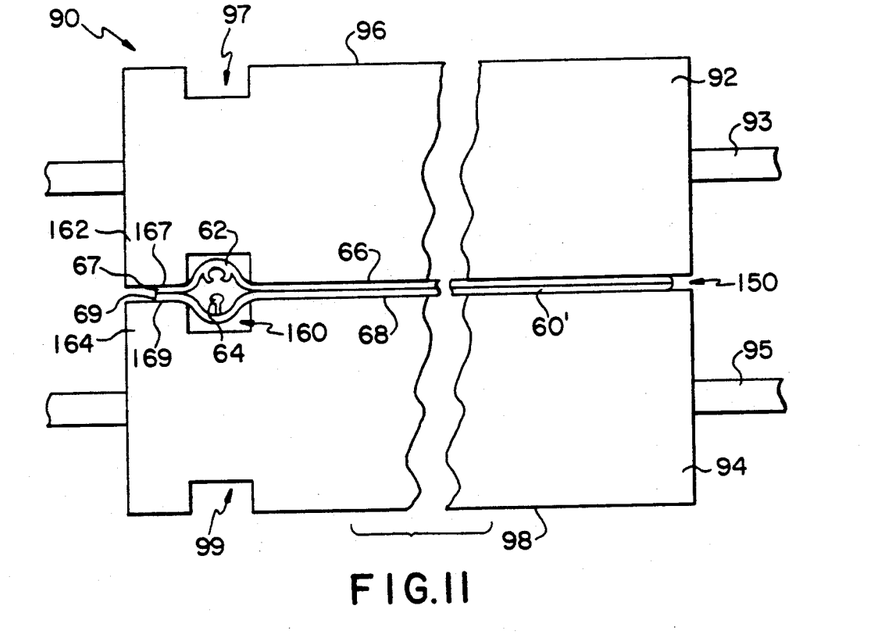
FIG. 11 is a side view in elevation looking upstream and showing the drive rollers of FIG. 6 with the extruded tube being shown in transverse cross-section.

Drive assembly 90 is best shown in FIG. 11 where it may be seen that upper drive roller 92 is rotatably journaled on an axel 93 while lower drive roller 94 is rotatably journaled on axel 95. One or both of axels 93 and 95 are mechanically driven, as is known in the art, so that rollers 92 and 94 co-act with one another in counter-rotation to advance flatted tube 60' in a downstream direction. To this end, drive roller 92 has an outer surface 96 which includes a circumferentially extending channel 97 formed proximate one edge thereof. Likewise, drive roller 94 has an outer cylindrical surface 98 in which is formed a circumferentially extending channel 99 also located proximate one end thereof. Rollers 92 and 94 are closely spaced with respect to one another to form a drive passageway 158 therebetween which drive passageway receives flattened tube 60' so as to driveably engage tube 60'. It may be seen that the end portions 162 and 164 respectively of drive rollers 92 and 94 form an extension of drive passageway 158 which is adapted to engage panel strip margins 167 and 169 respectively adjacent longitudinal edges 137 and 139 of panel strips 66 and 68. Circumferential channels 97 and 99 are opposed to one another so that an enlarged open channel passageway 160 is formed thereby. Channel passageway 160 is sized to accommodate male and female sealing ribs 62 and 64 without applying an engaging force so that tube 60' may be advanced by drive assembly 90 without re-engagement of the sealing ribs.

Figure 12A:
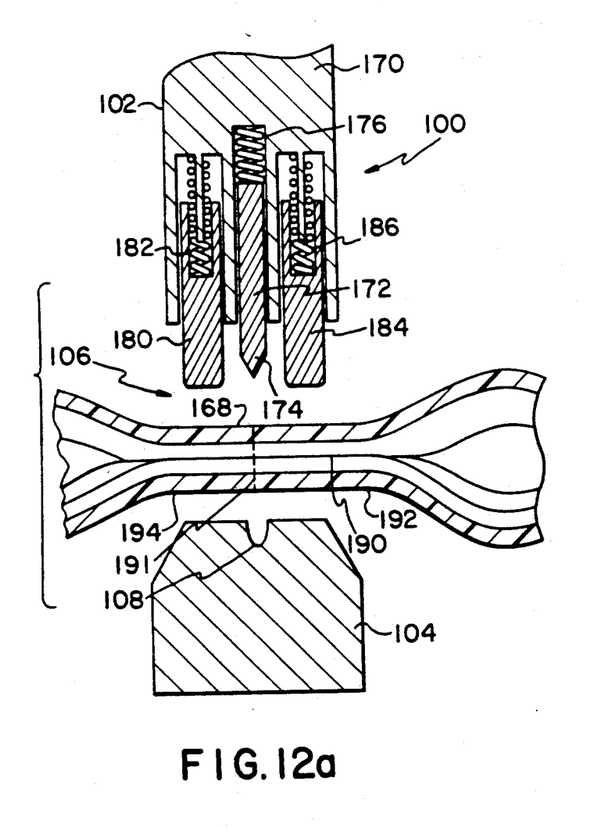
FIG. 12(a) is a longitudinal cross-sectional view showing the sealer and cutter assembly of FIG. 6

Seal and cut assembly 100 is best seen in FIG. 12(a) and, it should be understood that the apparatus shown herein is solely for representative purposes as various edge sealant and cut assemblies are known in the art. In FIG. 12(a), and as described above, seal and cut assembly 100 includes a combination edge sealer and cutter 102 which acts against anvil 104 to transversely seal flattened tube 60' by forming a transverse seal band 190 at a seal point 168. Seal and cut assembly 100 is periodically operable to form consecutive edge seals which are longitudinally spaced from one another as flattened tube 60' is advanced through passageway 106 so as to define longitudinally adjacent storage bags as the tube is advanced in the downstream direction.

Combination edge sealer and cutter 102 includes a base assembly 170 from which downwardly depends a cutter bar 172 which terminates, at a distal end, in knife 174. Cutter bar 172 is spring loaded for example, by representative spring 176 so that, when knife 174 impacts tube 60' and bears against anvil 104, tube 60' is transversely severed or cut along a sever line completely across the tube. The spring bias of cutter bar 172 helps prevent damage to knife 174 and, to this end, anvil 104 is provided with a transverse channel 108 which helps protect the edge of 174. Base 170 also slideably receives a pair of sealing bars 180 and 184 which are respectively spring biased by springs 182 and 186. Sealer bars 180 and 184 are heated, in a conventionally known manner, to a temperature sufficient to heat seal panel strip 66 and 68 together along transverse band 190.

The operation of seal and cut assembly 100 may now be more fully understood and appreciated. As base assembly 170 is reciprocated toward anvil 104, sealing bars 180 and 184 first contact panel strip 66 and forces panel strip 66 against panel strip 68 and the combination thereof against anvil 104. This force causes male rib 64 to engage female rib 66 at seal point 168 since the ribs have been guided and aligned pre-engagement relation to one another. Heat generated by seal bars 180 and 182 then operates to melt ribs 62, 64 and panel strips 66, 68 together along transverse band 190 which extends at least from ribs 62, 64 transversely to longitudinal tube edge 136, but preferably completely across tube 60'. As base assembly 170 continues to advance towards anvil 104, sealer bars 180 and 184 retract against the biasing forces of springs 182 and 186 so that cutter bar 172 moves outwardly to protrude from between cutter bars 180 and 184. Knife 174 thus impacts tube 60' within seal band 190 so as to sever tube 60' within this transverse edge seal at cut line 191. As base assembly 170 moves away from anvil 104, cutter bar 172 and knife 174 first retract and the entire assembly, including sealer bars 180 and 184 next retract away from the severed tube 60'. This separates tube 60' as a completed storage bag 10. It may be therefore seen that a downstream margin of the side edge seal designated as 192 forms a side edge 18 of a downstream storage bag while an upstream margin 194 of the edge seal forms a downstream side edge of an adjacent storage bag.

Figure 12B:
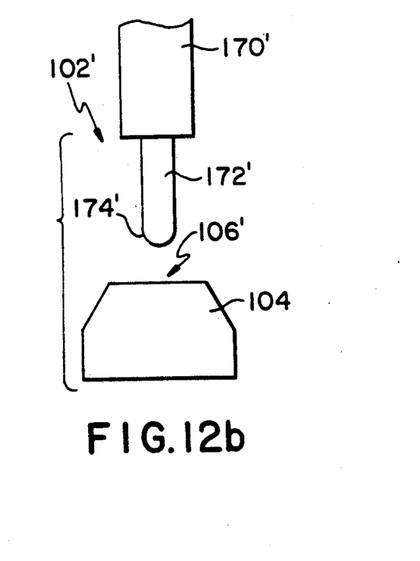
FIG. 12(b) is a longitudinal cross-section of a simplified sealer and cutter assembly.

A simplified edge sealer and cutter assembly 102' is shown in FIG. 12(b). Here, base assembly 170' mounts a hot knife 172'. Base assembly 170' may reciprocate against anvil 104'. Flattened tube 60' passes through region 106' between the distal end 174' of hot knife 172'. In this embodiment, hot knife 174' is of a sufficient temperature not only to mount panel strips 66 and 68 together, but also to completely melt through tube 60' so as to heat cut a storage bag 10 from tube 60'. Again, this edge sealer and cutter 102' is a device known in the art.

Figure 13:
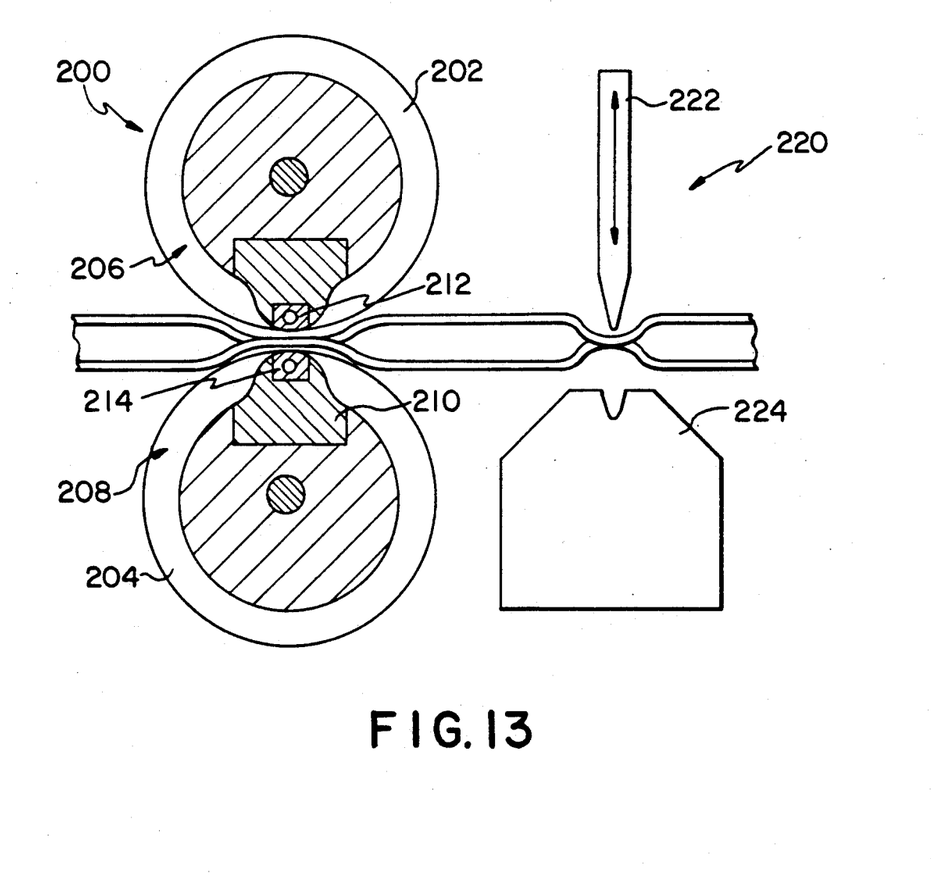
FIG. 13 is a longitudinal cross-sectional view of an alternate embodiment of the sealer and cutter assembly.

FIG. 13 shows an alternate embodiment of the edge seal and cutter assembly wherein the sealing and cutting operations are performed sequentially as opposed to substantially simultaneously as is the case with the apparatus shown in FIG. 12(a) and 12(b). In FIG. 13, a distinct sealing assembly 200 is shown in the form of a pair of co-acting sealing rollers 202 and 204. These rollers have circumferential channels, 206 and 208 respectively, which are similar to channels 97 and 99 on drive rollers 92 and 94. Insulated inserts 208 and 210 extend longitudinally of each roller 202 and 204 so that they extend transversely of flattened tube 60' located therebetween. Each of insulating bars 208 and 210 respectively mount heating elements 212 and 214 which project radially towards one another and, into opposition as rollers 202 and 204 counter-rotate. Insulated inserts 208 and 210 have cam surfaces 216 and 218, respectively, which first engage the sealing ribs so that, as sealing ribs 62 and 64 engage, heating elements 212 and 214 will form a seal band completely across tube 60'. As rollers 202 and 204 continue to rotate, away from one another and tube 60' advances towards a cutter assembly 220 which includes a reciprocating knife bar 222 that acts against anvil 224 to sever the adjacent storage bags from one another. It should thus be appreciated that the distance between consecutive edge seals, which define the width of storage bag 10, is determined by the circumference of rollers 202 and 204. Further, the operation knife blade 222 must be timed so that the sever line falls within the transverse seal band formed by heating element 212 and 214. Naturally, other sealing and cutting apparatus is within the scope of the present invention.

Based on the foregoing explanation of the first exemplary embodiment of the preferred apparatus, it may now be understood that the method according to the present invention broadly includes a plurality of fabricating steps all of which are specifically directed to the fabrication of storage bags which have the above described configuration. The broad method is directed to the new and useful fabrication of such bags so that, as each bag is produced, it respective mouth is in an open condition. When packaged and used, the storage bags are available in a manner such that the user does not need to struggle with opening the bag mouth.

Accordingly, the broad method of the present invention comprises a first step of extruding material at an upstream location to form a continuous tube having continuous male and female ribs extending longitudinally therealong at spaced circumferential locations. Next, this tube is advanced in a downstream direction and flattened so that the male and female ribs are positioned in opposed relation to one another after which the tube is guided in a manner such that the male and female ribs are maintained in a separated yet aligned pre-engagement relation. Next, the tube is transversely sealed to form transverse seal bands at spaced longitudinal locations along the extruded tube with the male and female ribs being engaged only at points within the sealed bands, and the tube is severed transversely within the sealed bands to consecutively produce storage bags each having an open mouth with the respective male and female ribs disengaged.

During the step of flattening the tube, the preferred method contemplates the matable engagement of the male and female ribs so that the methodology according to the present invention is being guided in an aligned relation and prior to the tube being transversely sealed. According to the present method, the steps of transversely sealing the tube and severing the tube may either be performed substantially simultaneously or may be performed sequentially. In either event, the sealing and severing of the tube is performed periodically to produce consecutive storage bags out of a continuous extruded tube.

With reference to FIGS. 14–21, it may also be seen that the present invention contemplates the fabrication of a plurality of storage bags organized as lateral sets so that, for each sealing and severing operation, more than one bag is produced. Preferably, a pair of storage bags are produced by this alternate apparatus and method with this pair of storage bags being joined by a common joining strip as more thoroughly described below.

Figure 14:
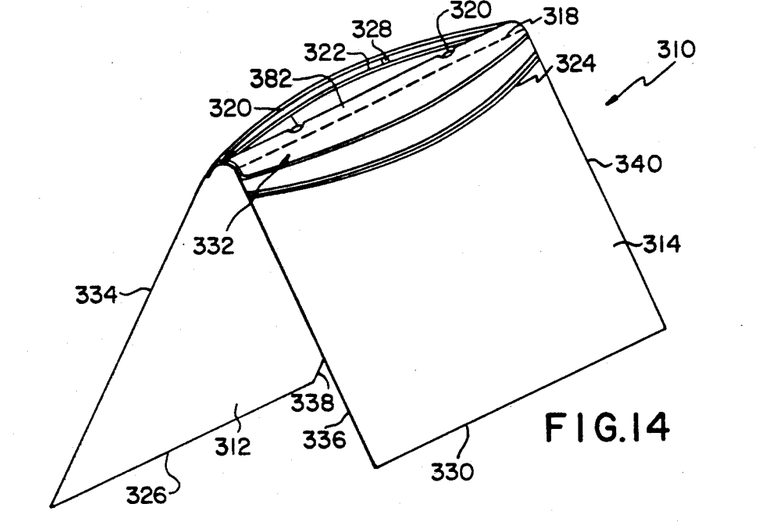
FIG. 14 is a perspective view of a dual storage bag pair connected by a adjoining strip.

FIG. 14 shows a pair of storage bags 310 as a first storage bag 312 that is lateral second storage bag 314. Bags 312 and 314 are joined together by a longitudinal joining strip 382 provided with perforations 318 so that bags 312 and 314 are partable from one another. Longitudinal joining strip 316 also has a pair of holes 320 which are formed to allow mounting of these bags in a rack dispenser. Bag 312 has complementary seal structure 322 while bag 314 has complementary seal structure 324. Storage bag 312 has a bottom edge 326 and an open mouth 328 opposite bottom edge 326. Similarly, storage bag 314 has a bottom edge 330 and an open mouth 332 opposite bottom edge 330. Storage bag 312 has side edges 334 and 338, and storage bag 314 has side edges 336 and 340. Edges 334 and 336 are co-extensive with one another as are edges 338 and 340.

Figure 15:
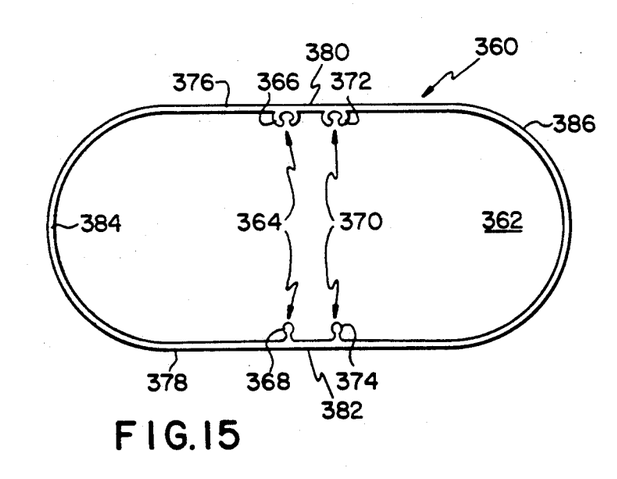
FIG. 15 is a transverse cross-section of a modified extruded tube according to the alternate embodiment of the present invention used to fabricate the storage bags shown in FIG. 4.

The pair of storage bags 310 shown in FIG. 14 may be fabricated from a continuously extruded tube of material, such as any suitable plastic, as is shown in FIG. 15. Tube 360 is shown in a partially flattened state and has an interior 362. A first pair of complementary sealing ribs 364 are formed intregally with tube 360 and include a female member 366 and a male member 368. Likewise, a second complementary pair of sealing ribs 370, including female rib 372 and male rib 374, are formed intregally with tube 360. Female ribs 366 and 372 are located on upper panel portion 376 of tube 360, and male sealing ribs 368 and 374 are located on a lower panel portion 378. It should be appreciated that the organization of the complementary pairs of the sealing ribs can be selected as desired. Thus, for example, ribs 372 and 374 could be interchanged so that there would be a male and a female rib on each of panels 376 and 378. In FIG. 15, however, an upper longitudinal joining strip 380 is located between female ribs 366 and 372 while a lower longitudinal joining strip 382 is located between male ribs 368 and 374. An arcuate portion 384 of tube 360 extends between ribs 366 and 368 while a second arcuate portion 386 of tube 360 extends between ribs 372 and 374.

Figure 16:
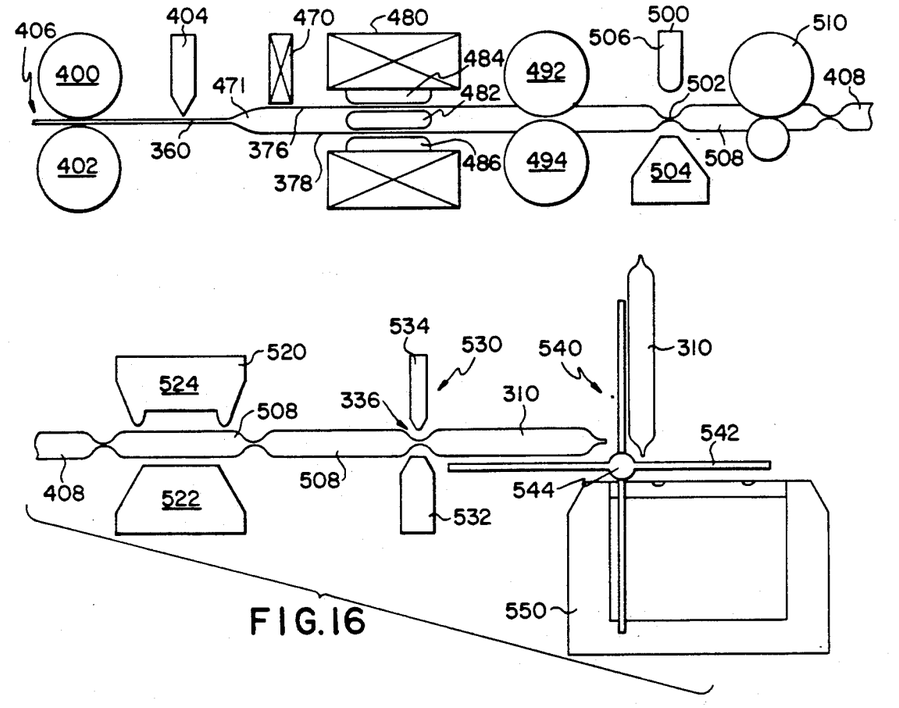
FIG. 16 is a diagrammatic view of the apparatus of the alternate embodiment of the exemplary apparatus used to fabricate the storage bags shown in FIG. 14.
Figure 17:
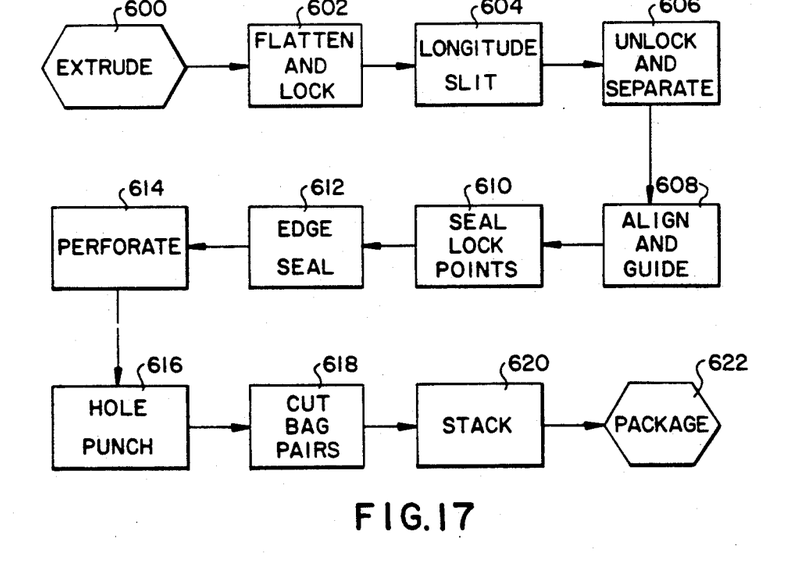
FIG. 17 is a block diagram similar to FIGS. 4 and 7 showing the processing steps for the apparatus of FIG. 16.

FIG. 16 is similar to FIG. 6 and shows, in diagrammatic form, the apparatus operative to form storage bag pair 310 according to this modified embodiment of the present invention. In FIG. 16, a first pair of drive rollers 400 and 402 operate to advance a flattened tube 360 from an upstream location 406 towards a downstream location 408. Knife 404 is provided to longitudinally slit panel 376 along joining strip 380. A separator bar apparatus 470 extends between upper panel strip 376 and lower panel strip 378 so that, as tube 360 is advanced downstream from rollers 400 and 402, panel strip 376 passes over separator bar 471 while panel strip 378 extends below separator bar 471. Accordingly, the complementary sealing ribs 366, 368 and 372, 374 are disengaged from one another. In order to avoid damage to the sealing ribs, separator bar 471 has a rounded nose.

After disengagement of the sealing rib pairs, panel strips 376 and 378 are advanced through a guide assembly 480 which includes a central platen 482 and a pair of guide plates, such as upper guide plates 484 and a lower guide plate 486, supported by suitable mounts. A second pair of drive rollers 412 and 414 are located downstream of guide assembly 480 and operate to engage and advance tube 360 therebetween. Drive rollers 492 and 494 are again constructed so as to advance the tube 360 without re-engaging sealing rib pair 366, 368 and sealing rib pair 372, 374. A transverse edge sealer assembly 500 is located downstream of rollers 492 and 494 and operates to transversely seal tube 360 along a transverse band 502 with each of the complementary pairs of ribs being engaged in one another only at the transverse band. Thus, tube 360 becomes a series of storage bag packets that are still interconnected to one another. This end, edge seal assembly 500 includes an anvil 504 against which strikes a hot sealing plunger 506. A perforator assembly 510, having a pair of co-acting wheels 511 and 515, is provided to form perforations 318 longitudinally along the lower longitudinal joining strip 382, as more thoroughly described below.

Continuing on in FIG. 16, though, it may be seen that tube 360 is continues to be advanced in the downstream direction from location 408. Tube 360 passes through hole punching assembly 520 which operates to fabricate holes 320 in the longitudinal joining strip 316, which corresponds to strip 382 in FIG. 15. Punching assembly 520 includes an anvil 522 and a reciprocating punch 524, as known in the art. Each bag packet 508 then passes through a transverse cutter assembly 530 including an anvil 532 and a knife 534 which is operative to separate each packet 508 into a storage bag pair 310, at downstream location 337. A wicket apparatus 540 includes a propeller blade 542 that rotates on its axis 544 so as to pick up each bag packet 310 so that they are stacked on a rack 550.

According to the methodology of the present invention, the apparatus of FIG. 16 performs a modified series of processing steps. These processing steps are diagrammed in FIG. 17. Here, the steps include first extruding the tube at 600, then flattening the tube 360 so as to lock the complementary sealing ribs together, as shown at step 602. The tube 360 is then longitudinally center slit, as shown at 604 after which the sealing ribs are unlocked and separated as is shown at location 606. Tube 360 is then driven so that the complementary sealing ribs are aligned and guided together at 608, after which the complementary pairs of sealing ribs are each locked together at selected points, shown by step 610 and the tube 360 is sealed, as shown at 612. It should be appreciated, though, that steps 610 and 612 can occur simultaneously such as by the combination sealing assembly 500 shown in FIG. 16. The tube 360 is then longitudinally perforated, as shown at 614, and tube 360 is then hole punched as shown at FIG. 316. The tube 360 is then transversely cut at 618 to form each bag pair 310 that may be then stacked. as shown at 320 and packaged, as 622 in any desirable manner.

Figure 18:
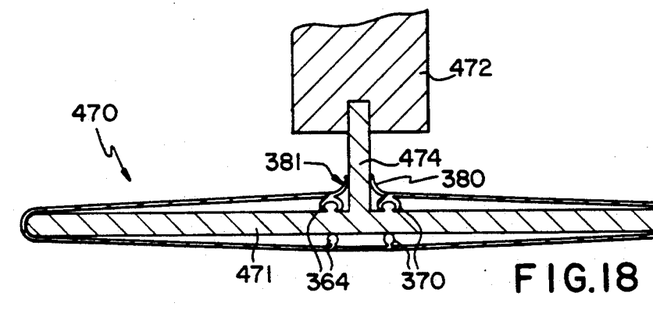
FIG. 18 is a transverse cross-section of the separator shown in FIG. 16 and looking in an upstream direction.

FIG. 18 shows in greater detail the separator bar assembly 470 according to this modified apparatus. Here it may be seen that separator bar assembly 470 includes the flattened separator bar 471 which is mounted to a suitable mount 472 by a vertical beam 474. As is shown in this figure, longitudinal joining strip 380 has been slit by knife 404 to form an opening 381 which accommodates beam 474. It may be seen that complementary sealing rib pair 364 is separated and, similarly, complementary sealing rib pair 370 is separated, each by separator bar 471.

Figure 19:
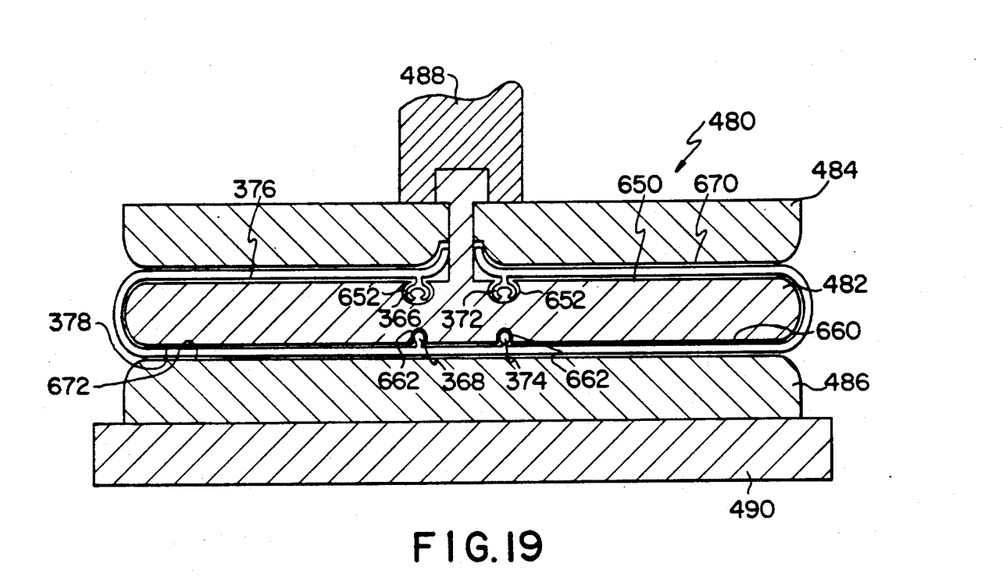
FIG. 19 is a transverse cross-section of the guide assembly shown in FIG. 16 and looking in an upstream direction.

After the pairs of sealing ribs 364, 370 are separated, tube 360 passes through guide assembly 480, as noted above. Guide assembly 480 is best shown in FIG. 19 where it may be seen that an upper mount 488 supports both upper guide plate 484 and central platen 482. A lower mount 490 supports lower guide plate 486. Central platen 482 has an upper platen surface 650 that has a pair of longitudinal grooves 652 formed therein with grooves 652 being sized to accommodate female ribs 366 and 372. Similarly, central platen 482 has a lower platen surface 660 that has longitudinal grooves 662 formed therein with grooves 662 being sized to receive and guide male ribs 368 and 374. Grooves 652, 662 are oriented in opposed relationship to one another so that the complementary pair of ribs 366 and 368 are in a pre-engaged position; likewise, grooves 652, 662 are opposed to one another so as to align ribs 372 and 374 in a pre-engagement position. Upper platen 484 has an upper guide surface 670 which is in closely spaced apart relation to upper platen surface 650 so as to provide a channel operative to receive upper panel 376 therein. Likewise, lower guide plate 486 has a lower guide surface 672 in closely spaced apart relation to lower platen surface 660 so as to define a passageway to receive lower panel 378 of tube 360.

Figure 20:
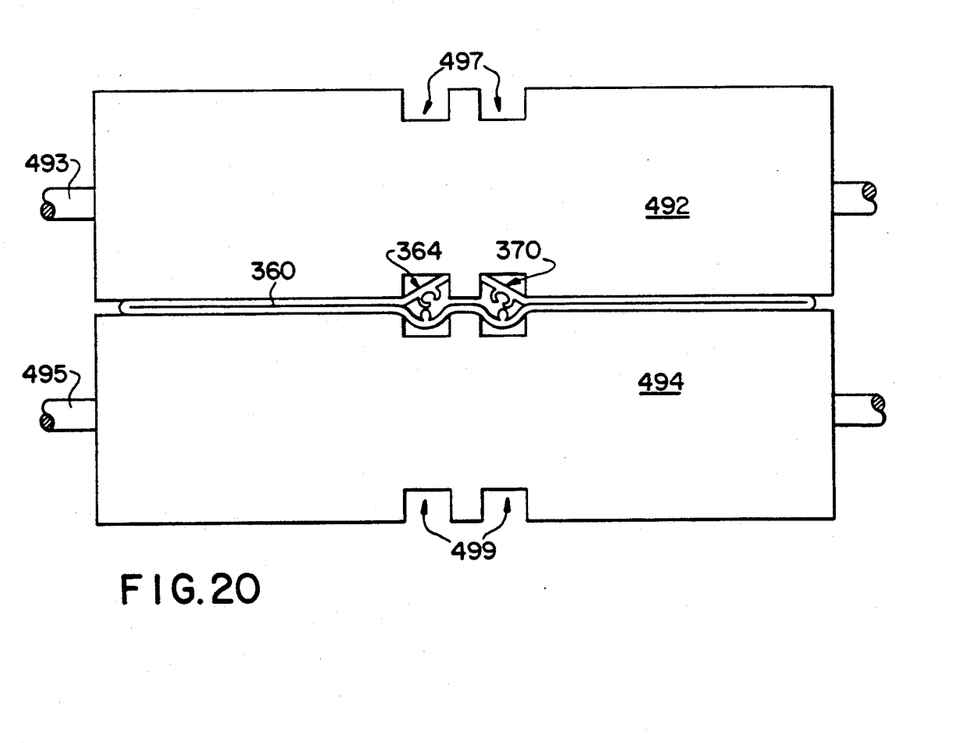
FIG. 20 is a side view of the drive rollers of FIG. 16 looking upstream with the extruded tube shown in cross-section.

Drive rollers 492 and 494 are best shown in FIG. 20 where it may be seen that rollers 492 and 494 rotate, respectively, on axels 493 and 495. Thus, rollers 492 and 494 co-act with one another to help advance tube 360 therebetween. Circumferentially extending channels 497 and 499 are again provided so as to allow passage of tube 360 therebetween without causing ribs 366, 368 and ribs 372, 374 to become re-engaged. This construction was described with more particularity in reference to FIG. 11, and does not need to be repeated here.

Figure 21:
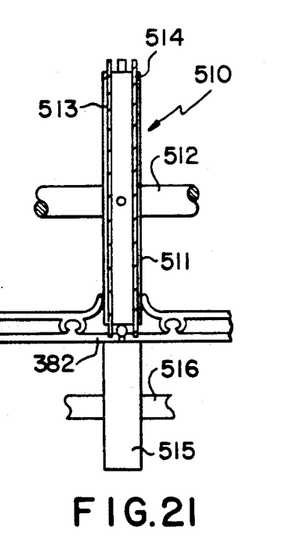
FIG. 21 is a side view in elevation looking upstream at the perforator assembly of FIG. 16.

Finally, FIG. 21 shows the perforating assembly 510 which includes an upper roller 511 that is rotatably journaled on axel 512. Wheel 511 is provided with a first step of teeth 513 and a second pair of teeth 514 which are laterally spaced from one another. Teeth 513 and 514 bear against a platen wheel 515 which is rotatably journaled on an axel 516. Thus, as joining strip 382 passes therebetween, perforations 318 are formed. With respect to hole punch assembly 520 and wicketeer 540, it is believed that these devices are well known in the art, so no further description of these devices are made beyond that set forth above with respect to FIG. 16.

It may be seen that the method according to this alternate apparatus is substantially the same as that described with respect to the preferred embodiment except that the transverse edge seal and cut operations are performed consecutively as opposed to simultaneously. Further, this method also provides for a method that fabricates a pair of storage bags simultaneously, with each of these storage bags having an open mouth when completed. Further, as a methodology according to the alternate apparatus provides for the steps of perforating the pair of bags along a longitudinal joining strip so that they may be partable from one another and also provides for the formation of holes in the longitudinal joining strip to allow for the convenient mounting of the bag pairs on a standard dispensing rack.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. Apparatus adapted to fabricate storage bags wherein each bag has front and back panels joined to one another along a common bottom edge and along a pair of common side edges so that said bag has an interior, said front and back panels having a respective top edge defining a mouth opening into the interior and having a pair of complementary sealing ribs extending between said side edges so that one sealing rib is on thee front panel proximate the top edge thereof and another of the sealing ribs is on the back panel proximate the top edge thereof, said sealing ribs oriented to engage one another to close said mouth and separable to open said mouth, said apparatus comprising:

an extruder at an upstream location operative to longitudinally extrude a continuous tube of material having a tube interior and wherein said tube has a pair of complementary sealing ribs formed integrally therewith longitudinally along the tube interior, said sealing ribs oriented parallel to one another so that said tube has first and second arcuate tube portions therebetween;

means for flattening said tube along first and second longitudinal tube edges whereby said sealing ribs are engaged and whereby continuous front and back panel strips are defined;

slit means for cutting said tube of plastic longitudinally between said sealing ribs along said first arcuate tube portion to form a longitudinal slit;

separator means located downstream of said slit means for disengaging said sealing ribs;

guide means extending through the slit in said tube for receiving and guiding said sealing ribs whereby said sealing ribs are maintained in a facing pre-engagement position with respect to one another;

drive means downstream of said guide means for advancing said tube, said sealing ribs correspondingly advancing through said guide means, said drive means including drive rollers having formed therein channels sized and positioned to accommodate said sealing ribs without re-engagment of said sealing ribs; and edge forming means for sealing and cutting said tube transversely thereacross so that side edges are formed for adjacent storage bags and so that storage bags are cut from said tube with each said storage bag having its respective pair of sealing ribs engaged at the side edges of the respective storage bag and with the pair of sealing edges disengaged from one another between the side edges thereof whereby the mouth of the respective storage bag is open.

2. Apparatus according to claim 1 wherein said guide means includes a central platen having a first platen surface on a first side thereof and a second platen surface on a second side thereof, a first guide plate positioned on the first side of said central platen and a second guide plate positioned on the second side of said central platen, said first guide plate having a first guide surface facing the first platen surface in closely spaced-apart relation to form a first guide channel and said second guide plate having a second guide surface facing the second platen surface in closely spaced-apart relation to form a second guide channel, said first platen surface having a longitudinally extending first groove sized to slideably receive one of the sealing ribs and said second platen surface having a longitudinally extending second groove sized to slideably receive another of the sealing ribs whereby said front and back panel strips may be received in and guided by the first and second guide channels with said sealing ribs received in and guided by the respective first and second grooves.

3. Apparatus according to claim 2, wherein the first and second platen surfaces are parallel to one another and wherein the first and second guide surfaces are parallel to the respective first and second platen surfaces.

4. Apparatus according to claim 1 wherein said stock has a plurality of complementary pairs of sealing ribs oriented so that each member of each said pair may be positioned in opposed facing relationship with its respective complementary sealing rib, said guide means guiding each pair of sealing ribs in a pre-engagement alignment with one another and said edge seal means across said stock to simultaneously form at least two storage bags laterally adjacent one another and connected by a longitudinal joining strip, said cutter means operative to sever the laterally adjacent storage bags as a connected pair of storage bags.

5. Apparatus according to claim 4 including means for perforating said longitudinal joining strip as said stock is advanced therethrough whereby each connected pair of storage bags may be separated from one another along perforations in their respective joining strip.

6. Apparatus accoding to claim 1 wherein said separator means, located upstream of said guide means, prepare said sealing ribs for aligned entry into said guide means.

7. Apparatus according to claim 6 wherein said separator means includes a separator bar extending through said slit and between said sealing ribs whereby, as said tube is advanced past said separator bar, each of said sealing ribs passes on an opposite side of said separator bar thereby to disengage said sealing ribs from one another.

8. Apparatus according to claim 7 wherein said separator bar is shaped to have a rounded cross-section.

9. Apparatus according to claim 8 wherein said separator bar is stationary.

10. Apparatus according to claim 1 wherein said drive rollers are located between said guide means and said edge sealing means.

* * * * *